United States Patent [19]
D'Amico

[11] Patent Number: 6,129,409
[45] Date of Patent: Oct. 10, 2000

[54] ROCK BOX LINER FOR A FLOOR OF A DUMP TRUCK BODY

[75] Inventor: John A. D'Amico, Casper, Wyo.

[73] Assignee: Western Technology Services International, Inc., Casper, Wyo.

[21] Appl. No.: 09/191,486

[22] Filed: Nov. 13, 1998

[51] Int. Cl.$^7$ .................................................. B60R 13/01
[52] U.S. Cl. ........................................ 296/184; 296/39.2
[58] Field of Search .................. 296/184, 39.1, 296/39.2, 41; 52/668

[56] References Cited

U.S. PATENT DOCUMENTS

| | | |
|---|---|---|
| 1,675,317 | 7/1928 | Burke . |
| 3,188,131 | 6/1965 | Attwood .................................... 296/28 |
| 3,897,972 | 8/1975 | Logue ....................................... 296/28 |
| 3,938,238 | 2/1976 | Kershaw et al. .......................... 29/469 |
| 5,454,620 | 10/1995 | Hill et al ................................. 296/184 |
| 5,476,285 | 12/1995 | Dickerson ............................... 280/781 |
| 5,599,055 | 2/1997 | Brown .................................... 296/39.2 |
| 5,803,531 | 9/1998 | Nielsen ................................... 296/184 |
| 5,851,043 | 12/1998 | Moutrey et al. ........................ 296/39.2 |
| 6,000,741 | 12/1999 | Reynolds et al. ....................... 296/39.2 |
| 6,007,132 | 12/1999 | Burg et al. .............................. 296/39.2 |

FOREIGN PATENT DOCUMENTS

| | | | |
|---|---|---|---|
| 864353 | 2/1971 | Canada .................................... 52/668 |
| 987064 | 4/1976 | Canada .................................... 52/668 |
| 62443 | 6/1955 | France ..................................... 52/668 |
| 1244800 | 9/1960 | France ..................................... 52/668 |
| 6720 | 3/1908 | United Kingdom ..................... 52/668 |
| 926407 | 5/1963 | United Kingdom ..................... 52/668 |

OTHER PUBLICATIONS

©1997 Leong Jin Corporation Pte Ltd; Leong Jin homepage Products & Services; Hardox 400/500 Abrasion Resistant Steel Plates, 5 pp.

*Primary Examiner*—D. Glenn Dayoan
*Assistant Examiner*—Patricia Engle
*Attorney, Agent, or Firm*—Thompson & Knight, L.L.P

[57] ABSTRACT

A rock box liner for a floor of a dump truck body includes a plurality of bins coupled to the floor. Each bin has an opening for receiving an amount of payload material from a payload that is deposited within or dumped from the body. When payload material from the payload is deposited within the bins, a portion of the payload material extends upward and outward from the openings of the bins to thereby create a supplemental surface upon which a substantial portion of the payload moves across when dumped. The supplemental surface shields the floor of the body from frictional wear due to loading and dumping of payloads and thus extends the body's operational life.

9 Claims, 4 Drawing Sheets

ROCK BOX LINER FOR A FLOOR OF A DUMP TRUCK BODY

FIELD OF THE INVENTION

The present invention relates to dump trucks and more particularly to a light-weight means for extending the operational life of a dump truck body. The rock box liner enables the formation of a supplemental surface of payload material upon the floor of the dump truck body when a payload is deposited within the dump truck body. The supplemental surface of payload material substantially shields the floor of the dump truck body from frictional wear due to loading and dumping operations. Consequently, the dump truck body's operational life is extended.

DESCRIPTION OF THE PRIOR ART

The use of a dump truck body for loading, transporting, and dumping payloads is well known in the prior art. By way of example, U.S. Pat. No. 1,675,317 to Burke discloses a truck body construction, and U.S. Pat. No. 3,897,972 to Logue discloses a reinforced dump body. However, a chief drawback to the use of a standard dump truck body such as disclosed in the '317 patent or the '972 patent is that the body's operational lifetime is significantly reduced since it is subjected to substantial frictional wear caused by payload material loading and dumping operations. For example, in typical loading and dumping operations such as those used in support of heavy-duty mining, components of mined ore usually have a hardness that is greater than the hardness of the dump truck body. Consequently, these mined ore components when placed in contact within the body as part of a heavy payload frictionally wear away the surface of the body during loading and dumping operations. This frictional wear is most pronounced at the rearward portion or spillway of the body where the dumping of the ore occurs.

One way to mitigate the frictional wear on a standard dump truck body and thus extend the body's operational lifetime is to construct those portions of the body that are most subjected to frictional wear out of a material that has a hardness which is greater than the hardest components of the payload material. An example of such a super-hard material that is conventionally used is chromium carbide. However, this material is expensive and difficult to attach to a dump truck body.

Yet another way to extend the operational lifetime of a standard dump truck body is to attach thick plates to protect those areas of the body that are most subjected to frictional forces, such as where dumping occurs. In this case, even as frictional wear on the standard body occurs during loading and dumping operations, the overall lifetime of the body would not be substantially reduced since both the protected and unprotected portions of the body would effectively wear out at nearly the same time. However, merely attaching thick plates to a standard uniform body structure greatly increases the total weight of the body and therefore decreases the dump truck's load carrying capability. Consequently, there exists a need for a dump truck body structure that allows dump truck payload capacity to be maximized and yet simultaneously provides increased strength, reduced body weight, and prolonged operational life.

SUMMARY OF THE INVENTION

The dump truck of present invention substantially departs from the prior art by providing a rock box liner for a floor of a dump truck body. The rock box liner is employed for enabling the creation of a supplemental surface of payload material when a payload is deposited within the body. The supplemental surface substantially shields the floor from frictional wear due to loading and dumping operations and thus extends the body's operational life.

The dump truck of the present invention uses a removable ramp that allows a substantial portion of a payload contained within the body to be readily disposed upon the rock box liner for later movement thereover during dumping operations.

The rock box liner of the present invention or portions thereof can also be readily removed and replaced when worn past a level of usability.

The rock box liner of the present invention or portions thereof can be readily removed and reconfigured to accommodate different sizes of payload material.

The rock box liner of the present invention allows portions of the floor of the body upon which it rests to be constructed of a material with a lesser thickness than would be required without its use, thereby reducing overall body weight and increasing payload capacity.

The rock box liner, in combination with a plurality of progressively thicker floor sections employed in the body, provides a floor structure that wear outs at a relatively uniform rate during loading and dumping of the payload to thereby maximize the body's operational life.

The present invention includes a dump truck body with a floor comprised of increasingly thick sections and a rock box liner coupled to the floor. The rock box liner includes a plurality of removable bins. Each bin has an opening for receiving an amount of payload material from a payload that is deposited within or dumped from the body. An amount of payload material that is deposited within the bins extends outward from most of the bin openings to thereby create in aggregate a supplemental surface upon which a substantial portion of a current or subsequent payload makes contact when loaded, rests upon when transported, and moves across when dumped.

DESCRIPTION OF THE PREFERRED EMBODIMENT

Figure 1:
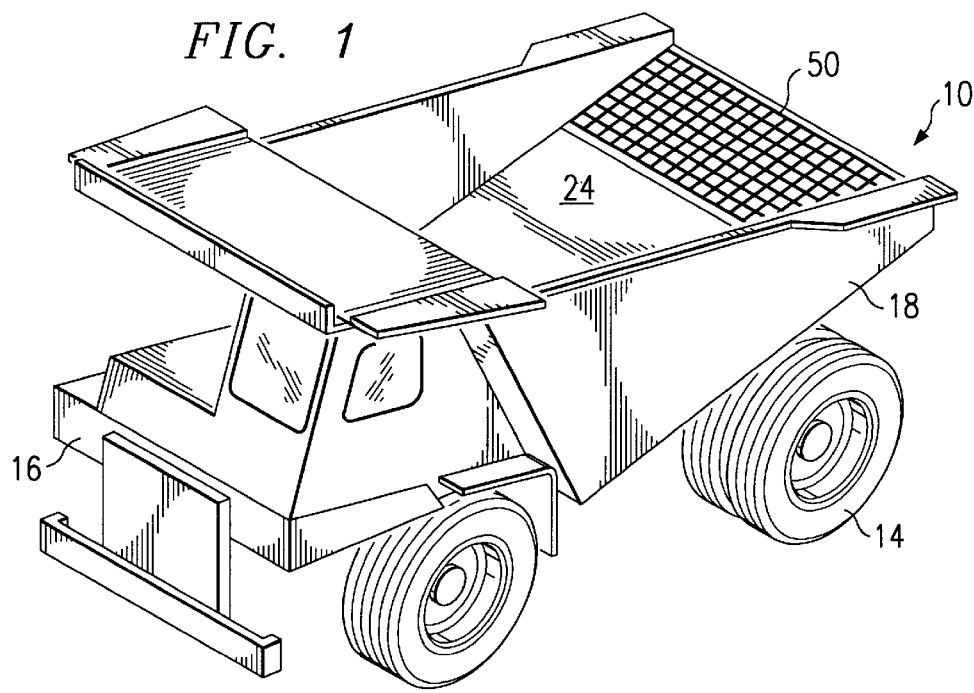
FIG. 1 is a perspective view of the preferred embodiment of the dump truck of the present invention with a rock box liner secured thereto.
Figure 2:
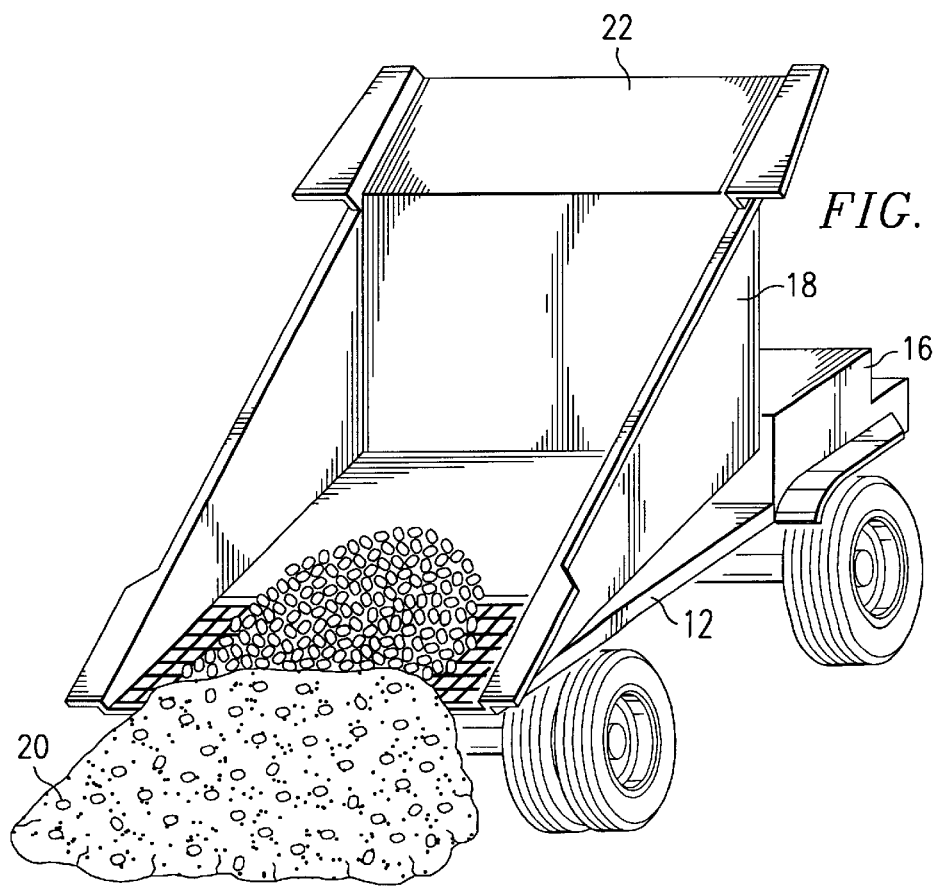
FIG. 2 is a perspective view of the dump truck dumping a payload.

Referring now to the drawings, and first to FIGS. 1 and 2, the dump truck of the present invention is generally designated by reference numeral 10. In the preferred embodiment, dump truck 10 is a large self-propelled off-highway vehicle capable of carrying hundreds of tons of material in operations such as mining and the like. Dump truck 10 includes a chassis 12 that is supported by large off-terrain tires 14. The chassis 12 carries a cab 16 at its forward end and a box-like rigid load carrying body 18 at its rearward end.

The body 18 is movably coupled to the chassis 12 with suitable unillustrated conventional mechanical or hydraulic lifting mechanisms that allow the body 18 to be retracted and extended in a manner known to those skilled in the art. As shown in FIG. 1, the body 18 is moveable to a retracted loading position that is generally parallel to the chassis for allowing a payload to be loaded and carried. The body 18 is further moveable to an extended unloading position such that the body is projected upwards and away from the chassis 12 for allowing a payload material 20 such as rock or ore to be dumped, as shown in FIG. 2.

As further shown in FIG. 2, the body 18 includes a rigid steel canopy 22. The canopy 22 is coupled to and extended outwardly from the body 18 and over the cab 16 when the body 18 is placed in the loading position. The canopy 22 serves to shield the cab 16 and the forward end of the dump truck from contact with the payload material 20 during loading.

Figure 3:
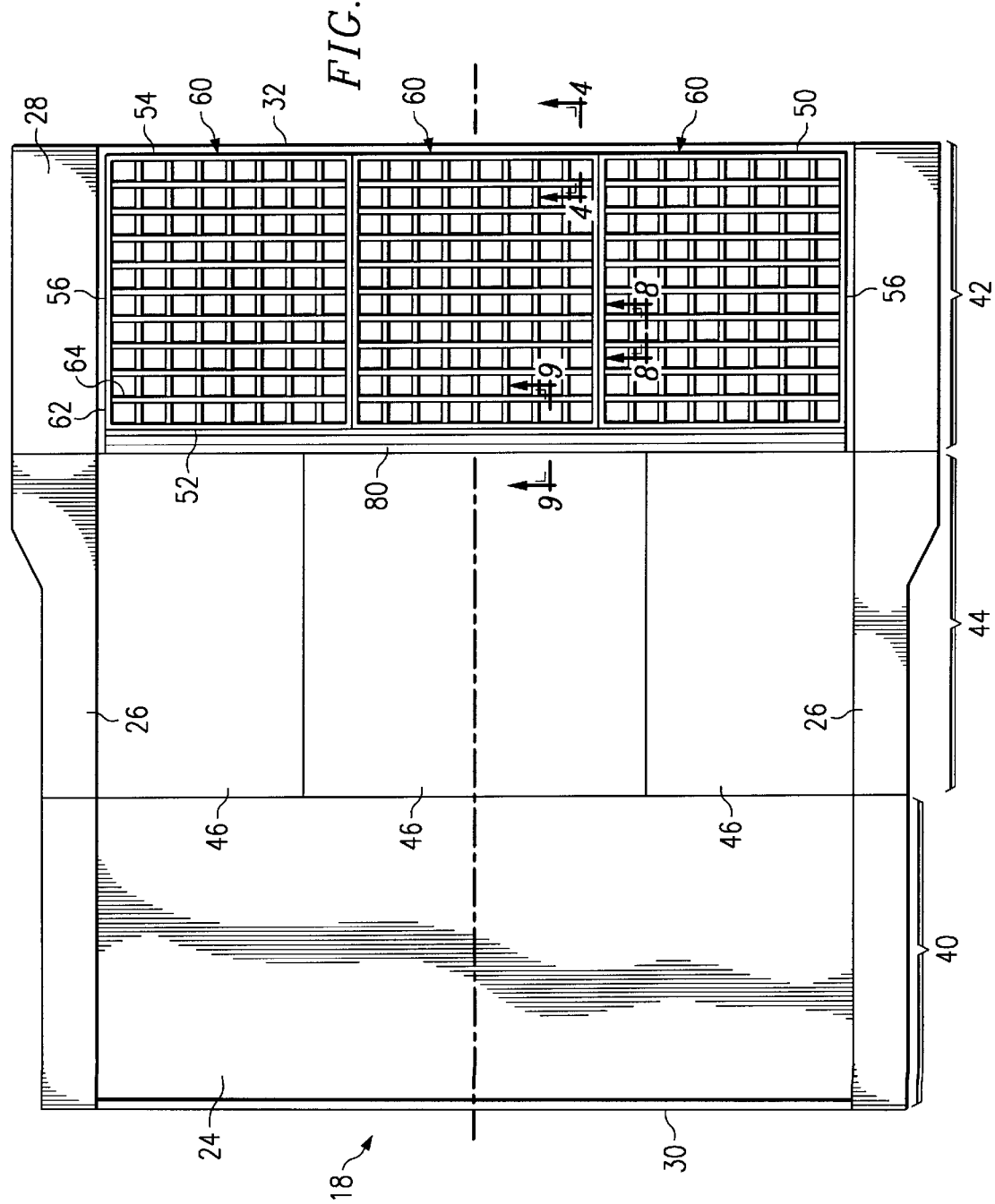
FIG. 3 is a plan view of the body and the rock box liner of the dump truck.

Referring now to FIG. 3, the body 18 has a substantially rigid planar floor 24. A pair of oppositely opposed, rigid, and spaced side walls 26, each having an outwardly extended rearward flange 28, is connected to the floor 24 and extended upwards therefrom. A rigid front wall 30 is connected to the floor 24, extended upwards therefrom, and further connected between the side walls 26. When the floor 24 and walls 26, 30 are connected together in this manner, a generally box-shaped payload material retaining space is created for carrying a payload, and a open rearward spillway 32 is created for dumping the payload material. Both the side walls 26 and front wall 30 are formed of steel plate.

The floor 24 of the body 18 includes a front section 40, a rear section 42, and an intermediate section 44 therebetween. The front section 40 and rear section 42 of the floor 24 are each formed of a separate piece of substantially rectangular steel plate, and the intermediate section 44 of the floor 24 is formed of three separate pieces 46 of substantially rectangular steel plate. The front section 40 and the rear section 42 of the floor 24 have a thickness of between about ½ inch and 9/16 inch, and the intermediate section 44 has a thickness of at least 1¼ inches.

Referring again to FIG. 1, a generally box-shaped rock box liner 50 is included and coupled to the body 18 such that it lines or covers a portion of the floor 24. More specifically, and referring to FIG. 3, the rock box liner 50 is coupled to the rear section 42 of the floor 24 of the body 18 and extended substantially thereover. The rock box liner 50 has an open top that extends into the payload material retaining space, a leading edge 52 that faces the front wall 30 of the body 18, a trailing edge 54 that faces the spillway 32 of the body 18, and side edges 56 that extend between the leading edge 52 and trailing edge 54. Each side edge 56 of the rock box liner 50 is positioned in proximity with and facing a respective side wall 28 of the body 18.

Figure 4:
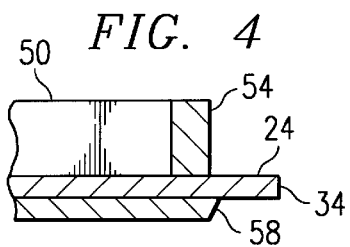
FIG. 4 is a cross sectional view of the floor and the rock box liner taken along the line 4—4 of FIG. 3.

As further illustrated in FIG. 3, the rock box liner 50 is formed of several individual frames 60. Each of the frames 60 can be replaced if it is damaged or unduly worn. Preferably, three equally-sized rectangular frames 60 are employed. As shown in FIG. 4, the rock box liner 50 is positioned upon the floor 24 such that its trailing edge 54 formed by the rearward extent of the frames 60 is slightly offset from the rearward edge 34 of the spillway 32. The rock box liner 50 and the floor 24 thereunder is supported by the rearward end of a standard supporting rib 58. Positioning the rock box liner 50 upon the body 18 in this manner precludes excessive weight from being directly applied to the outermost extent of the spillway 32.

Figure 5:
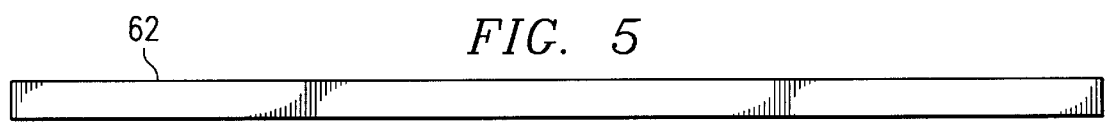
FIG. 5 is a side elevational view of a frame bar of the rock box liner.
Figure 7:
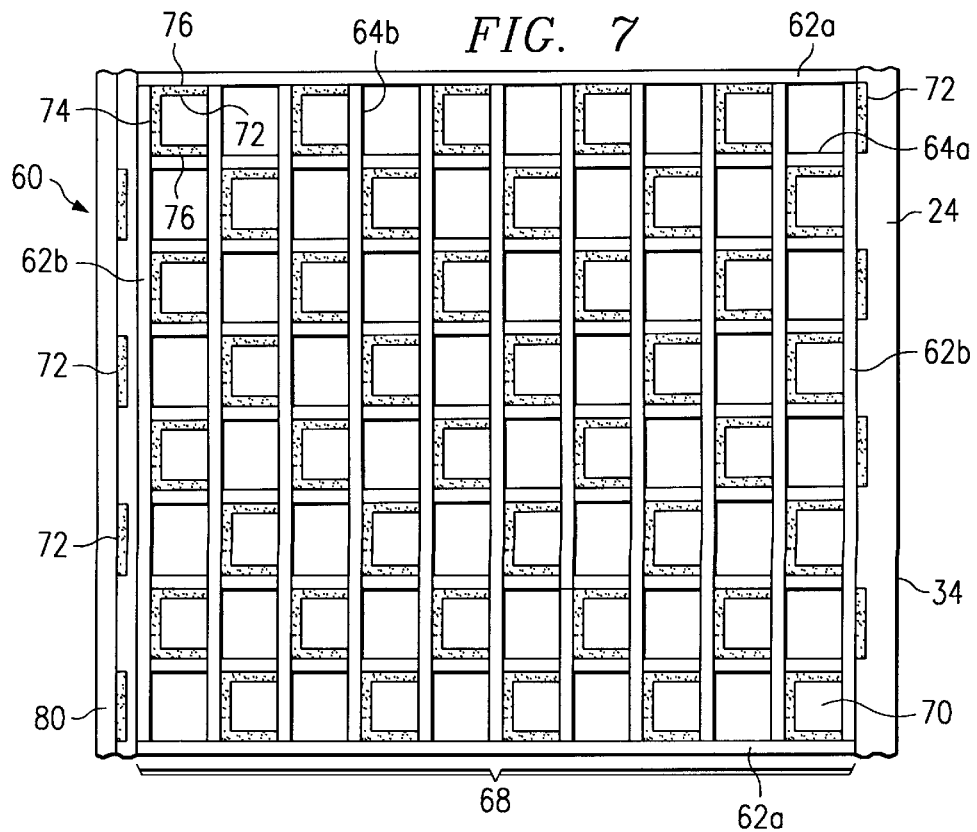
FIG. 7 is a plan view of a frame of the rock box liner.

Referring again to FIG. 3, each frame 60 is formed of four frame bars 62 that are coupled together in a nearly end-to-end configuration. Each individual frame bar 62 is substantially linear and rectangular in shape, as shown in FIG. 5. More specifically, each frame 60 includes a pair of longitudinally positioned and long frame bars 62a and a plurality of transversely positioned short frame bars 62b, as shown in FIG. 7. Each frame bar 62a and 62b is substantially rectangular in cross-section and formed of rigid steel. Each long frame bar 62a has a length of about 95.1 inches, a width of about 1 inch, a height of about 2 inches, and a weight of about 54 pounds. Each short frame bar 62b has a length of about 79 inches, a width of about 1 inch, a height of about 2 inches, and a weight of about 45 pounds.

Figure 6:
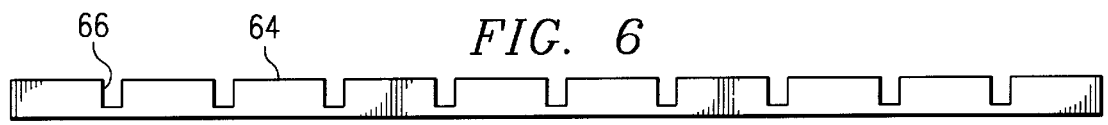
FIG. 6 is a side elevational view of a grid bar of the rock box liner.

As shown in FIG. 7, each frame 60 of the rock box liner also includes sixteen grid bars 64 that are extended thereacross and coupled together. As shown in FIG. 6, each individual grid bar 64 is substantially linear, rectangular in shape, and has a plurality of uniformly spaced rectangular notches 66 disposed on one free long edge thereof. More specifically, and referring again to FIG. 7, each frame 60 has seven longitudinally positioned, parallel, and uniformly spaced long grid bars 64a that are extended between the short frame bars 62b. Each frame 60 also has nine transversely positioned, parallel, and uniformly spaced short grid bars 64b that are extended between the long frame bars 62a and across the long grid bars 64a. Since the transversely positioned grid bars 64b are generally subjected to more stress and frictional wear during dumping operations than the longitudinally positioned grid bars 64a, grid bars 64b are positioned across grid bars 64a such as to allow their ready replacement if damaged or unduly worn.

Each grid bar 64a and 64b is substantially rectangular in cross-section and formed of rigid steel. Each long grid bar 64a has a length of about 93.1 inches, a width of about 1 inch, a height of about 2 inches, and a weight of about 49 pounds. The spacing between the notches on each long grid bar 64a is about 9.4 inches. Each short grid bar 64b has a length of about 79 inches, a width of about 1 inch, a height of about 2 inches, and a weight of about 42 pounds. The spacing between the notches on each short grid bar 64b is about 8.9 inches.

Figure 8:
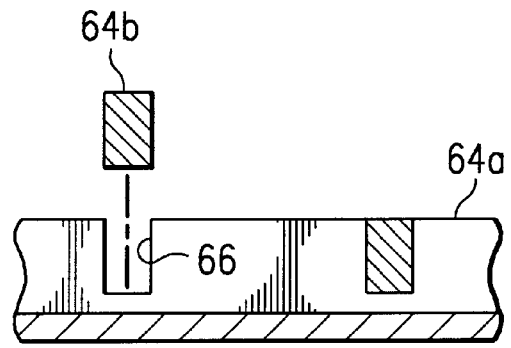
FIG. 8 is a cross sectional view of the floor and rock box liner taken along the line 8—8 of FIG. 3 with one of the transverse grid bars of the rock box liner removed.

Referring now to FIG. 8, to achieve coupling between grid bars 64a and 64b, the notches 66 of the long grid bars 64a are mated within the corresponding unillustrated notches of the short grid bars 64b. The long grid bars 64a thereby provide additional rigidity and strength to the short grid bars 64b for withstanding forces placed upon the short grid bars 64b by a payload during dumping operations. When coupled together in this manner, the long grid bars 64a and the short grid bars 64b create a matrix 68 of box-shaped bins 70, as shown in FIG. 7. Each bin 70 has a rectangular upper opening and a depth of about 2 inches.

As further shown in FIG. 7, each frame 60 with its associated matrix 68 of bins 70 is removably coupled to the floor 24 through the use of conventional fillet welds 72. More specifically, within each bin 70, a fillet weld 72 is used to connect the lower inner leading edge 74 and the lower inner side edges 76 of bin 70 with the floor 24. Fillet welds 72 are used to fasten every other bin 70 of the matrix 68 to the floor 24 of the body. As a result, a substantially linear intermittent fillet weld is established across an entire length of one side of each long grid bar 64a, one side of each short grid bar 64b, one side of each long frame bar 62a, and one side of the forwardly positioned short frame bar 62b. In addition, an intermittent fillet weld 72 is used to fasten a lower edge extent of the rearwardly positioned short frame bar 62b to the floor 24 at a location slightly offset from the rearward edge 34. By using this arrangement of intermittent fillet welds, only one-half of a lower edge extent of each bar 62a, 62b, 64a, and 64b of frame 60 is connected to the floor 24, thereby making it relatively easy to pry one or more off the bars 62a, 62b, 64a, and 64b away from the floor 24 for replacement, particularly the transversely positioned bars 62b and 64b, which are subjected to the most stress and frictional wear due to payload material dumping operations. A conventional prying tool such as a heavy duty crow bar or the like can be used to pry the bars 62a, 62b, 64a, and 64b from the floor 24.

Figure 9:
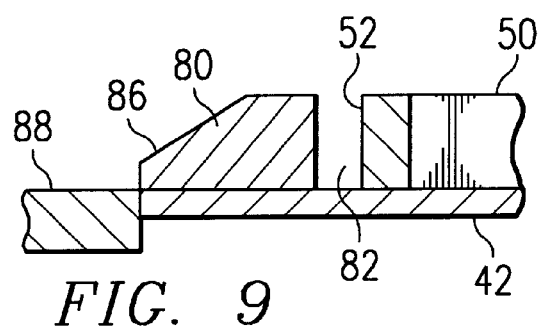
FIG. 9 is a cross sectional view of the floor, the bumper bar, and the rock box liner taken along the line 9—9 of FIG. 3.

Referring now to FIG. 7, an elongated bumper bar 80 is also provided. The bumper bar is coupled to the rear section 42 of the floor with fillet welds 72 and extended substantially and transversely thereacross, as best shown in FIG. 3. Referring now to FIG. 9, the bumper bar 80 is fastened to the floor 24 at a location slightly offset from the leading edge 52 of the rock box liner 50. As a result, a gap 82 is created between the bumper bar 80 and the rock box liner 50. Gap 82 allows access to the bumper bar 80 to facilitate its removal and replacement when unduly worn without disturbing the position or structural integrity of the rock box liner 50. A heavy duty crow bar or the like can also be used to pry the bumper bar away from the floor.

In addition, the bumper bar 80 has an upper surface 86 that slopes upwardly from the top surface 88 of the floor to the top of the rock box liner 50. The bumper bar is substantially linear, formed of rigid steel, and has a length of about 242.8 inches, an overall width of about 4 inches, a height of about 2 inches, and a weight of about 551 pounds. The total weight of the rock box liner 50, including the bumper bar 80, is about 3308 pounds.

Figure 10:
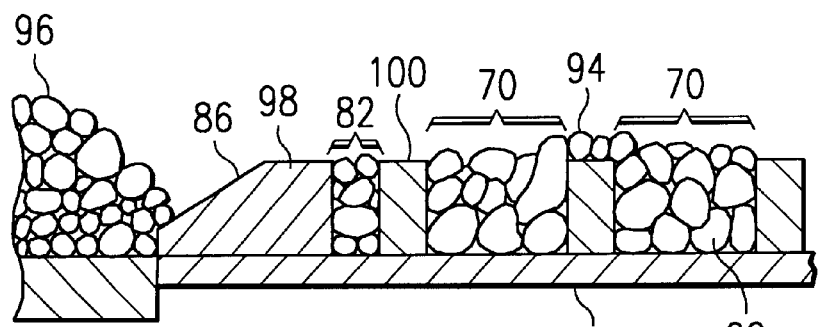
FIG. 10 is a cross sectional view of a portion of the floor, the bumper bar, and the rock box liner with payload material disposed therein.

Referring now to FIG. 10, the present invention is placed into operation when a payload is deposited within the bins 70 and gap 82. Payload material 90 from the payload is automatically deposited within the bins 70 and gap 82 during successive loading and dumping operations. Therefore, dedicated or manual placement of payload material within the rock box liner is not required for operation. The payload material extends outward from most of the openings of the bins 70 and gap 82 to thereby create a supplemental surface 94 that extends across and over the rear section 42 of the floor 24. The supplemental surface 94 serves to support some part of a payload that rests upon the rear section 42 of the floor when such payload is being transported from one location to another. In addition, during dumping operations, a substantial portion 96 of the payload slides or travels over the top surface 86 of the bumper bar and across the supplemental surface 94. The bumper bar 80 thus serves as a ramp 98 for easing movement of the portion 96 of the payload toward the supplemental surface 96 and further prevents damage to the leading edge 52 of the rock box liner 50. Upon reaching the supplemental surface 94, the portion 96 of the payload then moves over the surface 94 and toward the spillway, from which it is eventually dumped, as shown in FIG. 2.

Referring again to FIG. 10, the supplemental surface 94 is essentially comprised of the payload material itself, with only the uppermost edges 100 of the grid bars and frame bars possibly being exposed to the frictional wear during loading and dumping operations. In other instances, the payload material deposited in the bins 70 is of such a size that other smaller pieces of payload material are wedged between the payload material in the bins 70 to thereby fully cover the grid bars, and thereby preclude exposure of the grid bars to frictional wear.

The use of the rock box liner with payload material fully deposited therein causes the rear section of the floor to effectively gain an additional 2 inches of thickness and also possess a hardness that approximates that of the deposited payload material itself. As a consequence, when the rock box liner 50 is filled, the overall thickness of the floor 24 of the body 18 generally increases from its front section 40 to its rear section 42. The progressively thicker floor sections 40 and 44 of the body in combination with the filled rock box liner 50 create the desired operational configuration for extending the floor's operational life. In particular, the rock box liner 50 shields the rearward section 42 of the floor of the body, since it is this rear section that is most subjected to frictional wear due to payload dumping operations. Furthermore, the entire rock box liner 50 or selected frames 60 thereof can be readily replaced when unduly worn or can be reconfigured to hold a different size of payload material of a given payload. The bumper bar 80 can also be readily removed and replaced as needed. All of these advantages arise from a relatively minor addition of approximately 3308 pounds of body weight contributed by the rock box liner 50 and bumper bar 80.

As may be readily ascertained by one skilled in the art, the rock box liner 50 can also be fabricated to cover or line a greater portion or even the entire floor of the dump truck body. The bins can also be formed of separate pieces or formed in clusters that are removably connected to the floor of the body with fillet welds. In addition, the bins of the present invention can also be fabricated such that their depths progressively increase nearer the spillway to thereby add additional payload material thickness for protecting the floor from the frictional forces that are concentrated at the spillway during dumping operations.

What is claimed is:

1. A rock box liner for a floor of a dump truck body comprising a plurality of bins coupled to the floor with each bin having an opening for receiving an amount of payload material from a payload when such payload is deposited within and dumped from the body and further comprising a ramp coupled to the floor for easing movement of an amount of payload material deposited within the body from the floor to the bins as the payload is dumped.

2. A rock box liner for a floor of a dump truck body comprising:

a frame formed of a plurality of frame bars coupled to the floor; and a plurality of grid bars extended across the frame and coupled to the floor to thereby create a plurality of open bins and further comprising a ramp coupled to the floor for easing movement of an amount of payload material deposited within the body from the floor to the bins when the payload is dumped.

3. A rock box liner for a floor of a dump truck body comprising a plurality of equally-sized rectangular frames each formed of a pair of longitudinally extended long frame bars and a pair of transversely extended short frame bars with each frame having a plurality of parallel spaced long grid bars extended between the short frame bars and with each long grid bar having a plurality of spaced notches disposed thereon, and with each frame further having a plurality of parallel spaced short grid bars extended between the long frame bars and across the long grid bars and with each short grid bar having a plurality of spaced notches disposed thereon, and with the notches of the long grid bars being mated with the corresponding notches of the short grid bars to couple the long grid bars with the short grid bars and thereby define a matrix of substantially box-shaped bins each having an upper opening.

4. The rock box liner as set forth in claim 3 and further comprising a elongated bumper bar coupled to the rear section of the floor and extended thereacross and with the bumper bar having an upper surface sloping upwardly from the floor to the rock box liner to thereby serve as a ramp.

5. The rock box liner as set forth in claim 3 and further comprising an amount of payload material deposited within the bins and extended outward from most of the openings thereof to thereby create a supplemental surface that a substantial portion of the payload moves upon when slid over the bumper bar and moves across when dumped from the body.

6. A dump truck comprising:

a chassis;

a cab mounted to the chassis;

a body movably coupled to the chassis and having a retracted position for allowing a payload to be carried and an extended position for allowing the payload to be dumped, and with the body further comprising a floor with a plurality of walls extended upwards therefrom to create a space for carrying the payload and a spillway for dumping the payload; and a rock box liner formed of a plurality of bins coupled to the floor of body with each bin having an opening for receiving an amount of payload material when such payload is deposited within and dumped from the body;

wherein a portion of the floor is formed of a plurality of increasingly thick sections.

7. A dump truck comprising:

a chassis;

a cab mounted to the chassis;

a body movably coupled to the chassis and having a retracted position for allowing a payload to be carried and an extended position for allowing the payload to be dumped, and with the body further comprising a substantially planar floor with a pair of oppositely opposed and spaced side walls coupled to the floor and extended upwards therefrom and a front wall coupled thereto and extended upwards therefrom and between the sidewalls to create a space for carrying the payload and a rearward spillway for dumping the payload, and wherein the floor further includes a front section, a rear section, and an intermediate section therebetween with the sections of the floor being substantially rectangular in shape with the front and the rear sections formed of rigid steel plate with a thickness of between about ½ inch and ⁹⁄₁₆ inch and the intermediate section formed of rigid steel plate with a thickness of at least 1¼ inches;

a rectangular rock box liner coupled to the rear section of the floor and extended substantially thereover, the rock box liner having a top bounded by a leading edge facing the front wall, a trailing edge facing the spillway and offset therefrom, and side edges therebetween each facing a respective sidewall, the rock box liner further having a plurality of equally-sized rectangular frames each formed of a pair of longitudinally extended long frame bars and a pair of transversely extended short frame bars with each frame having a plurality of parallel spaced long grid bars extended between the short frame bars and with each long grid bar having a plurality of spaced notches disposed thereon, and with each frame further having a plurality of parallel spaced short grid bars extended between the long frame bars and across the long grid bars and with each short grid bar having a plurality of spaced notches disposed thereon, and with the notches of the long grid bars being mated with the corresponding notches of the short grid bars to couple the long grid bars with the short grid bars and thereby define a matrix of substantially box-shaped bins each having an upper opening.

8. The dump truck as set forth in claim 7 and further comprising an elongated bumper bar coupled to the rear section of the floor and extended thereacross at a location offset from leading edge of the rock box liner and with the bumper bar having an upper surface sloping upwardly from the floor to the top of the rock box liner to thereby serve as a ramp.

9. The dump truck as set forth in claim 7 and further comprising an amount of payload material deposited within the bins and extended outward from most of the openings thereof to thereby create a supplemental surface that a substantial portion of the payload moves upon when slid over the bumper bar and moves across when dumped from the body.

\* \* \* \* \*